United States Patent [19]

Riordan

[11] 4,140,353
[45] Feb. 20, 1979

[54] SKID CONTROL SYSTEM

[75] Inventor: Hugh E. Riordan, Wyckoff, N.J.

[73] Assignee: Kelsey-Hayes Company, Romulus, Mich.

[21] Appl. No.: 443,256

[22] Filed: Feb. 19, 1974

Related U.S. Application Data

[60] Division of Ser. No. 193,393, Oct. 28, 1971, Pat. No. 3,870,376, which is a continuation of Ser. No. 761,045, Sep. 20, 1968, abandoned.

[51] Int. Cl.$^2$ ............................................. B60T 8/08
[52] U.S. Cl. ................................. 303/97; 188/181 A; 303/106
[58] Field of Search .................. 73/510, 511, 517 A; 188/181 A; 244/111; 303/20, 21 A, 93, 97, 105, 106, 110; 307/10 R; 317/5; 324/162; 340/53, 62, 262; 361/238

[56] References Cited

U.S. PATENT DOCUMENTS

| 2,874,810 | 2/1959 | Brown | 188/181 A |
| 3,275,384 | 9/1966 | Hirzel | 303/21 CG |
| 3,494,671 | 2/1970 | Slavin et al. | 303/21 P |

FOREIGN PATENT DOCUMENTS

| 395459 | 11/1937 | Canada | 303/21 B |
| 1349121 | 12/1963 | France | 303/21 B |
| 764788 | 2/1955 | United Kingdom | 303/21 BE |
| 829720 | 9/1957 | United Kingdom | 303/21 F |

Primary Examiner—Stephen G. Kunin
Attorney, Agent, or Firm—Harness, Dickey & Pierce

[57] ABSTRACT

A skid control system for controlling the brakes of the wheels of a wheeled vehicle in accordance with a deceleration rate which is preselected in accordance with the coefficient of friction between the wheel and the road whch is determined by sensing the spin-up rate of the wheels during the time of brake relief. Additionally, the time that the valve is operated to relieve pressure at the brakes is varied with vehicle speed and with the coefficient of friction between the wheel and the road.

22 Claims, 5 Drawing Figures

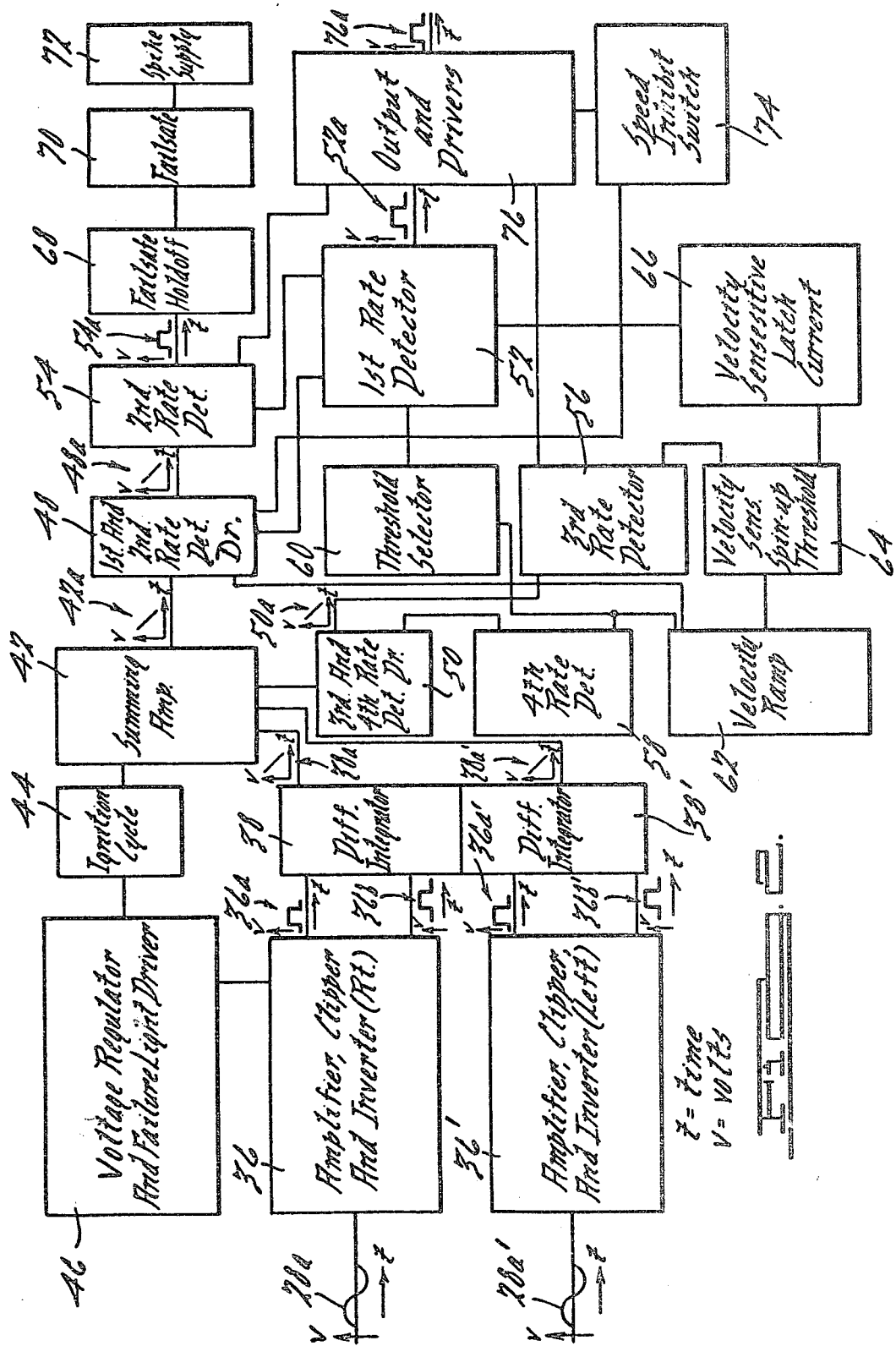

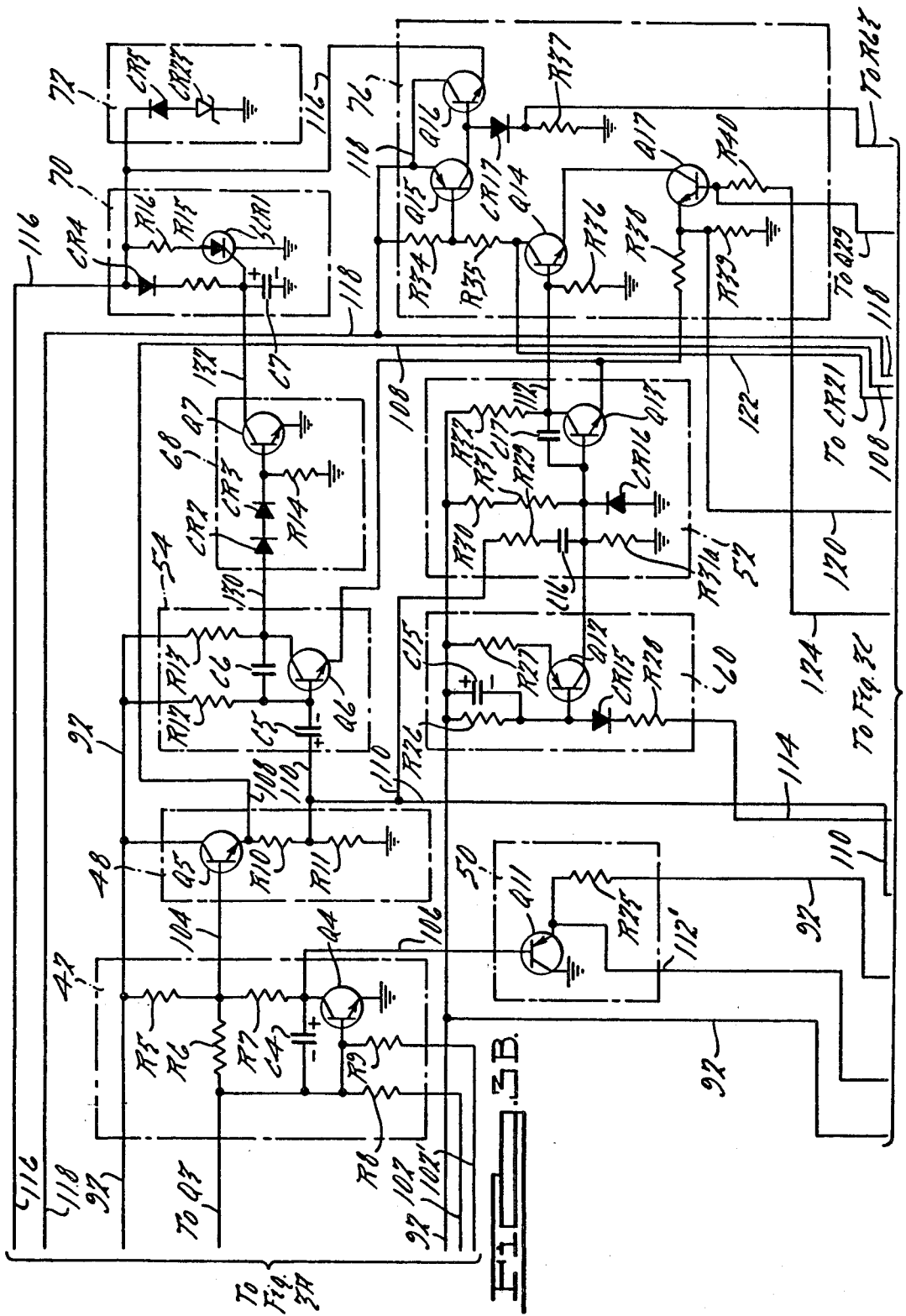

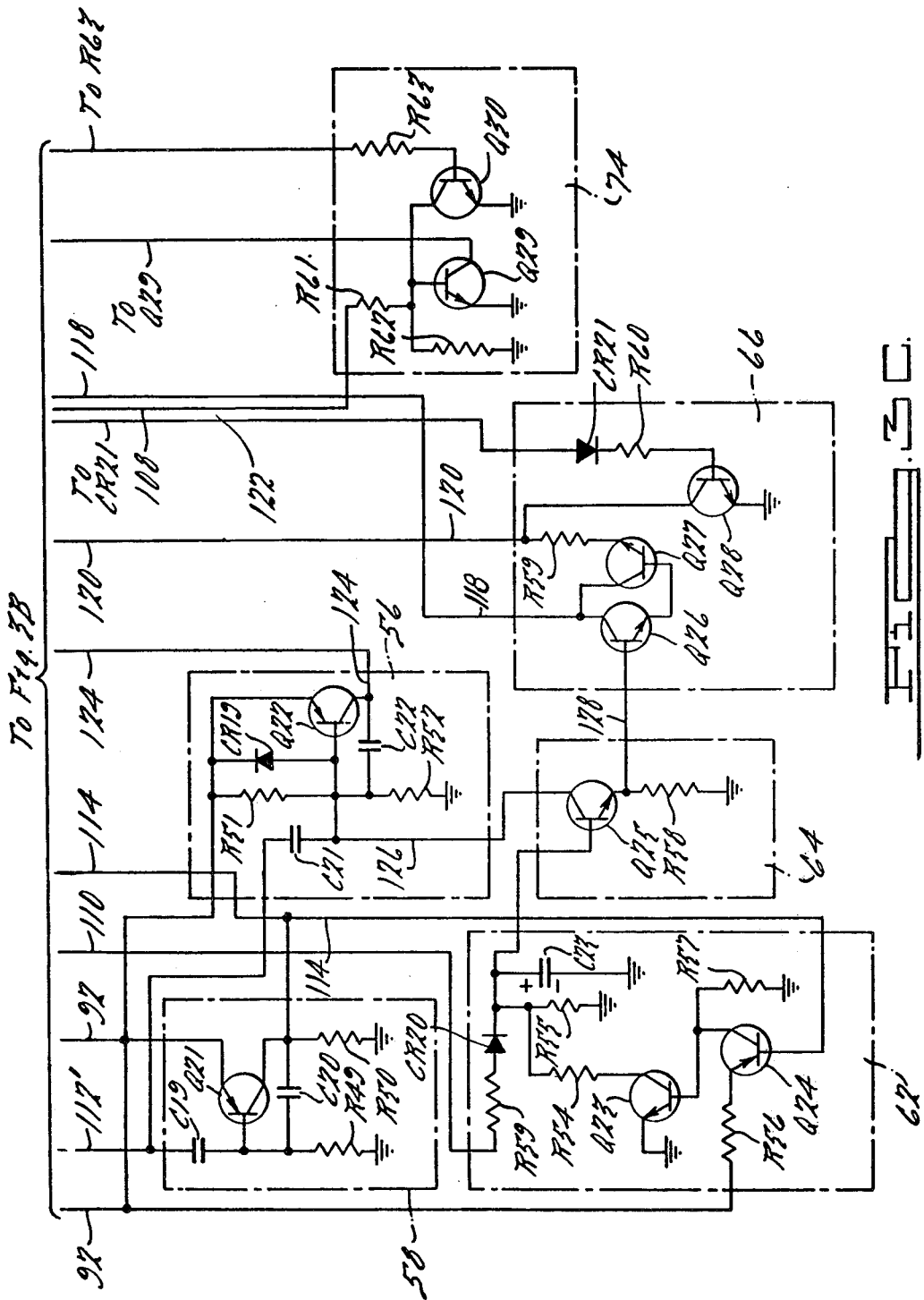

SKID CONTROL SYSTEM

This is a division, of application Ser. No. 193,393, filed Oct. 28, 1971, now U.S. Pat. No. 3,870,376, which in turn is a continuation of application Ser. No. 761,045 filed Sept. 20, 1968.

SUMMARY BACKGROUND OF THE INVENTION

The present invention relates to skid control systems, and more particularly relates to a skid control system including a novel control circuit.

It is an object of the present invention to provide a novel skid control system for controlling the brakes of the wheels of a wheeled vehicle.

It is another object of the present invention to provide a novel skid control system for fluid actuated brakes for wheels of a wheeled vehicle including a novel control circuit for actuating a modulating valve for modulating or controlling the pressure to the brakes in response to an electrical signal indicating the occurrence or the imminence of a wheel skid condition.

In the system of the present invention the modulating valve is actuated in response to an electrical signal indicating the occurrence of a preselected deceleration rate; in order to accommodate different surface conditions and provide optimum operational characteristics this rate is varied depending upon the surface condition which is sensed by sensing the spin up rate of the wheels being controlled during the time of brake relief. In addition, the time duration that the valve is operative to relieve pressure at the brakes of the controlled wheels is varied with road conditions and vehicle speed.

In the system of the present invention a vehicle speed analogue is provided which during each brake relief senses the linear velocity of the vehicle by sensing the velocity attained by the controlled wheels. This information is stored and is used for the next cycle to vary the time at which the brakes are reapplied in accordance with velocity. This provides for better high speed operation. The sensed velocity signal is allowed to change with time during each cycle at a preselected rate such that at any time an analogue approximating vehicle speed will be had. Two separate means are provided for determining when the brakes are to be reapplied. One means senses wheel spin up and is actuated at high spin rates, indicating high mu surfaces; the analogue is used to vary this occurrence with velocity such that at higher velocities the wheels can spin up more. The second means senses vehicle deceleration and reapplies the brakes after a determinable interval. This latter means is designed to be sensitive to low mu surfaces; in addition, the time for reapplying the brakes is increased with velocity in accordance with the velocity analogue.

When the system is used to control two wheels in unison, means are utilized to compensate for wheel brake unbalance which could permit one wheel to decelerate faster than the other, etc. Unless some compensation were provided a situation could occur in which one wheel was near vehicle speed while the other was in substantial slip; in such a condition most of the braking would be caused by only one wheel resulting in inefficient braking. To prevent this in the present system means are provided requiring the wheels to reach a minimum selected velocity before relief of the brakes. All of the above noted features contribute to an improved system and enhance the stability of the vehicle.

Therefore, it is another object of the present invention to provide a skid control system including one or more of the above noted features.

Other objects, features and advantages of the present invention will become apparent from the subsequent description and the appended claims, taken in conjunction with the accompanying drawings, in which:

FIG. 2 is a block diagram depicting the various portions of a skid control system embodying features of the present invention; and FIGS. 3A, 3B and 3C (put together) are a schematic diagram of an electrical control circuit for the system of the present invention.

The skid control system of the present invention can be utilized and will be described specifically for use with an automotive vehicle; however, it should be understood that the features of the invention could be utilized with other types of wheeled vehicles including aircraft. For an automotive vehicle, the system of the present invention can be utilized in connection either with the front wheels, the rear wheels or the front and rear wheels. The system will be described for use in conjunction only with the rear wheels of an automotive vehicle. The system of the present invention is generally of the type shown and described in the co-pending U.S. Pat. application to Every et al, No. 642,861, filed June 1, 1967 and that disclosure is incorporated herein by reference. Application Ser. No. 642,861 of June 1, 1967 has been abandoned with a continuation application thereof having been filed on July 10, 1969 as Ser. No. 842,825, now U.S. Pat. No. 3,515,440, issued June 2, 1970.

Figure 1:
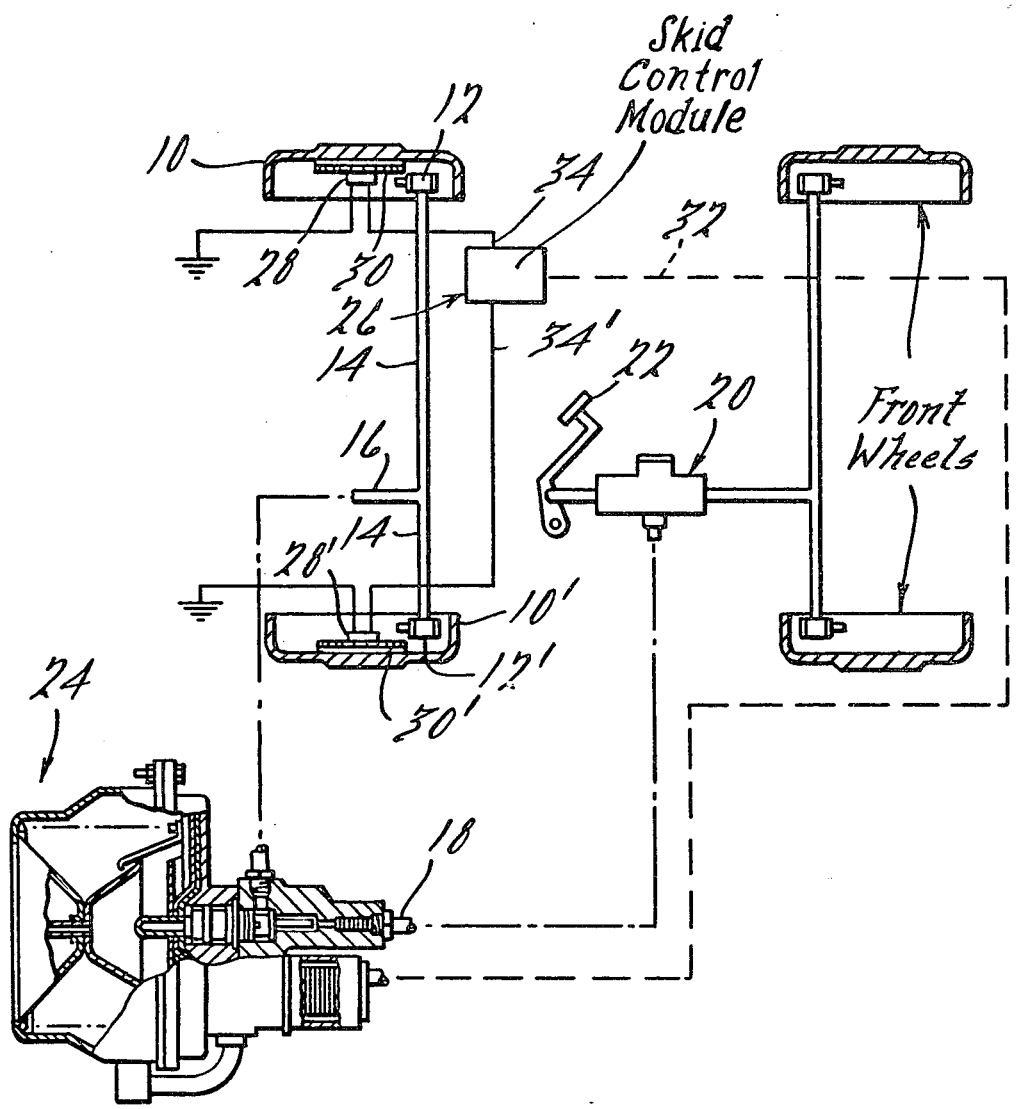
FIG. 1 is a generally schematic diagram of a skid control system embodying features of the present invention.

Looking now to FIG. 1, the schematic diagram generally shows the skid control system for use with the rear wheels of an automotive vehicle with the rear wheels being equipped with brake drums 10, 10' and wheel brake cylinders 12, 12'. Hydraulic lines 14 are connected to the cylinders 12, 12' and to a common fluid line 16 which is pressurized by a master cylinder assembly 20 via a line 18. The master cylinder assembly 20 can be of a conventional construction and actuated through a foot pedal 22. The fluid pressure from master cylinder 20 can be modulated by means of a modulating valve 24 which is connected between the fluid lines 18 and 16, and hence the modulating valve 24 can control the fluid pressure to the wheel brake cylinders 12, 12' and hence can control the operation of the brakes. The brakes associated with the brake drum 10, 10' can be of a conventional construction and hence the details thereof have been omitted for the purposes of simplicity. The modulating valve 24 can be of the type shown and described in the co-pending patent application of Every et al (supra) and the details thereof have been omitted for purposes of simplicity.

The modulating valve 24 in the present system is actuated in accordance with an electrical signal obtained from an electrical control module 26. The control module 26 receives information from sensors 28, 28' associated with each of the brake drums 10, 10' by means of exciter rings 30, 30'. The sensors 28, 28' can be of constructions known in the art and since the specific details thereof do not constitute a part of the present invention they have been omitted for the purposes of simplicity. The exciting rings 30, 30' can be of a toothed construction and the sensors 28, 28' can be of a permanent magnet or electro-magnetic construction which together define a variable reluctance pickup. The exciter rings 30, 30' would be rotated with the brake drums 10, 10' and hence with the associated wheels, and by virtue of the toothed construction, could via sensors 28, 28' generally provide a pulsating or alternating electrical signal via conductors 34, 34' to the module 26 which signal would be an indication of the rotational velocity of the associated wheels.

The control module 26 is constructed to sense the rate of change in the signal at the conductors 34, 34' and hence to sense the deceleration rate of the wheels associated with the brake drums 10, 10' and to provide an output signal in response to the magnitude of the deceleration of the wheels associated with the brake drums 10, 10' reaching a preselected magnitude corresponding to a skid condition existing or to be occurring at the wheels associated with drums 10, 10'. The output or control signal is transmitted by means of conductor 32 to the modulating valve 24. The average angular velocity for a pair of rear wheels driven by a prop shaft through an axle assembly can be obtained by sensing the angular velocity of the prop shaft. The advantages of the present invention can be obtained when either a direct signal is obtained from the wheels or when a signal of wheel angular velocity is obtained from the prop shaft. In the system of the present invention the control module 26 provides an "on" or "off" signal and modulation of the fluid pressure to the brake cylinders 12, 12' will be provided by the modulating valve 24.

A block diagram of the control modulator circuit 26 is shown in FIG. 2 and comprises first and second amplifier clipper and inverter sections 36, 36', first and second differentiator integrator sections 38, 38' associated with sections 36, 36', respectively, a summing amplifier section 42, an ignition cycle section 44, a voltage regulator and failure light driver section 46, a first and second rate detector driver section 48, a third and fourth rate detector driver section 50, a first rate detector section 52, a second rate detector section 54, a third rate detector section 56, a fourth rate detector section 58, a threshold selector section 60, a velocity ramp section 62, a velocity sensitive spinup threshhold section 64, a velocity sensitive latch current section 66, a fail-safe holdoff section 68, a fail-safe section 70, a spike suppressor section 72, a speed switch section 74 and an output driver section 76.

The amplifier, clipper and inverter sections 36, 36' are connected to the wheel sensors 28, 28' and receive the generally sinusoidal input waves (28a, 28a') which have a frequency which varies with the angular velocity of the rear wheels 10, 10'. The amplifier clipper and inverter sections 36, 36' amplify and clip the sine waves 28a, 28a' to provide a square wave of substantially constant amplitude but varying in frequency in accordance with variations in the frequency of the input wave. An inverter portion is utilized to provide frequency doubling so that two square wave pulses, i.e., 36a, 36b and 36a', 36b', will be provided for each cycle of the sine wave input 28a, 28a'. The square wave output, of constant amplitude, is transmitted from the sections 36, 36' to the differentiator integrator sections 38, 38' where it is differentiated and then integrated to provide for direct current signals 38a, 38a' which vary in magnitude generally in accordance with variations in the frequency of the input signals 28a, 28a'. Note that by frequency doubling in sections 36, 36' the amplitude of integrated signals 38a, 38a' is increased. The signals 38a, 38a' are added in the summing amplifier section 42 which, as will be seen, can be a Miller integrator whereby the output therefrom will vary in accordance with the average amplitude of signals 38a, 38a'. The output signal 42a from the summing amplifier section 42 is transmitted to the first and second rate detector driver section 48 and the third and fourth rate detector driver section 50. The sections 48 and 50 provide isolation of the summing amplifier section 42 from the remainder of the sections to prevent excess of loading of section 42. As will be seen, both sections 48 and 50 comprise emitter followers; hence the output signals 48a, 50a will generally follow the summed output 42a. As will be seen, the signals 48a, 50a from sections 48, 50 are used to control actuation and deactuation of the valve 24.

In the present system the output and driver section 76 provide the output signal 76a via conductor 32 to actuate the deactuate the modulating valve 24. Generally, the section 76 is actuated in response to a preselected detected deceleration rate which is indicative of an incipient skid condition whereby signal 76a is initiated causing modulating valve 24 to be actuated whereby pressure to the brakes is relieved. Note that this skid condition can occur under surface conditions which vary widely, i.e., wet ice to dry concrete, and under these conditions it is advantageous to vary the actuation of the valve 24. In order for the system to be responsive to different surface conditions, i.e., different mu surfaces, it has been found advantageous to vary the threshold deceleration rate at which the output section 76 is actuated. It has also been found desirable to vary the elapsed actuation time or "on-time" of modulating valve 24 to accommodate various surface conditions. This requires variation in the time at which the output section 76 is deactuated, i.e., output signal 76a at conductor 32 terminated. In order to simplify the description of the operation of this system and the associated circuitry, first that part of the system will be described, which results in modulating valve 24 being actuated, i.e., output section 76 being actuated; next, that portion of the system will be described which deactuates the modulating valve 24, i.e., deactuating the output section 76; and finally the circuit details will be described.

VALVE ACTUATION

Still looking to FIG. 2, the output signal 48a from the first and second rate detector driver section 48 is transmitted to both the first rate detector section 52 and the second rate detector section 54.

The first rate detector 52, by differentiating the signal 48a, provides a signal having a magnitude varying in accordance with the rate of change of the potential of the signal 48a. The first rate detector 52 is responsive only to negative changes, i.e., deceleration, and when the derivative of the signal 48a attains a preselected magnitude indicating an excessive deceleration rate first detector 52 is actuated to provide a signal 52a whereby the output section 76 will be actuated to initiate the output signal 76a whereby modulator 24 is actuated and brake pressure relieved. Note that while the initiation of the output signal 52a will cause initiation of the output signal 76a, termination of the signal 76a is caused by termination of the signal 52a, only under certain circumstances to be described.

It is desirable that the actuation of the valve 24 be varied in accordance with different surface conditions. On high mu surfaces the tendency for the wheels to lock up is less than on low mu surfaces and hence the brakes can be held on longer and thus it is desirable that the actuation of the valve 24 be at a higher deceleration rate on high mu surfaces. The above variation in valve actuation is provided by the present system with the spin up of the wheels during brake relief being used to provide an indication of the mu of the surface, i.e., high mu, high spin up or acceleration. Thus, in order to accommodate various surface conditions, a threshold selector 60 is utilized and is connected to the first rate detector 52 such that the magnitude of the rate of change in the voltage signal 48a required to actuate the first rate detector 52 will be varied under selective conditions. These conditions are wheel spin up or acceleration during relief of brake pressure. The fourth rate detector section 58 senses spin-up and operates on the threshold selector section 60 whereby the threshold for the first rate detector section 52 will be varied.

The fourth rate detector section 58 receives the output signal 50a from the third and fourth rate detector driver section 50 and is responsive to acceleration; section 58 senses the spin up of the wheels after the brakes have been released upon actuation of the modulating valve 24. On low mu surfaces the wheels will tend to keep slipping and will spin up slowly; on high mu surfaces the wheels will spin up rapidly. This difference in spin up will provide for a different magnitude of signal from the fourth rate detector section 58 to vary the effect of the threshold selector 60 whereby the threshold of the first rate detector section 52 will be varied. A memory circuit is provided such that the signal from the fourth rate detector section 58 will be effective to vary the threshold of the first rate detector section 52 for the next skid control cycle, Generally the variation in the threshold to the first rate detector section 52 by the fourth rate detector 58 (spinup) is to accommodate high mu surfaces by requiring higher deceleration rates to actuate the first rate detector section 52 thereby resulting in delaying the time in a skid cycle at which the output section 76 will be actuated. As noted, the time for actuation can be delayed more for a high mu surface than a slow mu surface since there is under these conditions more time to act before a locked wheel condition will occur. This means that by delaying actuation the brakes will be applied for as long a period as possible thereby minimizing stopping distances.

Thus it can be seen that the system as described so far provides means responsive to a deceleration rate varying in accordance with the surface conditions. While the first rate detector 52 provides the signal 52a which initiates the actuation of the output section 76, and hence actuation of valve 24, the first rate detector 52 does not necessarily result in deactuation of valve 24.

VALVE DEACTUATION

It is desirable that the cessation of the actuation of the output section 76 be controlled to reflect different surface and speed conditions. For high mu surfaces it is desirable to permit reapplication of brake pressure soon after initiation of spinup since wheel spinup is rapid. For low mu surfaces it is desirable to delay reapplication of brake pressure to permit the wheels to spinup since wheel spinup is slow. For low and high mu surfaces at high velocities it is desirable to delay brake reapplication to permit more spinup than at lower velocities. This is effectuated by the system of the present invention. The output section 76 can be deenergized (valve 24 deactuated) through one of two sections, either through the first rate detector section 52 as affected by the velocity sensitive latch current section 66 or the third rate detector section 56 as affected by the velocity sensitive threshold section 64. The third rate detector section 56 generally controls for high and medium mu surfaces, while the first rate detector section 52 will generally control low mu surfaces.

As noted, it is desirable to vary the deactuation time for the output section 76 and for the valve 24 in accordance with vehicle velocity. This is done by use of the velocity ramp section 62 through the velocity sensitive latch section 66 and spinup threshold section 64.

The velocity ramp section 62 is connected to the first and second rate detector drive section 48 and receives the signal 48a which is indicative of the angular velocity of the rear wheels. The velocity ramp 62 stores the signal 48a in a storage circuit which has a faster charge rate than discharge rate. The discharge rate is selected to reduce the magnitude of the stored signal in accordance with a preselected ideal deceleration rate which is less than that for a skid condition. In one application a rate equivalent to a change in vehicle velocity of 8 ft./sec$^2$ was selected. Thus with the occurrence of a skid condition the velocity signal 48a would substantially decrease in magnitude to a magnitude less than the stored velocity signal. The stored signal in the velocity ramp 62 would discharge at a rate equivalent to the selected ideal vehicle deceleration rate and at an interval later provides a signal having an adjusted magnitude approximating vehicle speed. This analogue of wheel speed is used to vary the threshold for the third rate detector via the threshold section 64. Note that an analogue of vehicle velocity is used since during braking, as the result of slip, the signal 48a does not provide a true indication of vehicle speed. This analogue is selected on the basis of an average or medium mu surface. For high mu surfaces the selected representative rate of deceleration (discharge rate) would be too slow and should be reset since it will allow the vehicle wheels to spinup too far, i.e., to vehicle speed. To provide this the ramp section 62 is connected to the fourth rate detector section 58 and at high spinup (acceleration) indicating a high mu surface the storage circuit of the ramp section 62 will be rapidly discharged and will be recharged to the value set by the velocity signal 48a and hence will more accurately reflect the vehicle velocity for subsequent cycles. The velocity ramp 62 providing an indication of the velocity of the vehicle in the above manner is connected to the velocity sensitive spinup threshold section 64 to vary the operation of the third rate detector 56 as a function of vehicle velocity. Thus third rate detector 56 receives the velocity signal 50a from the third and fourth rate detector driver 50 and is responsive to a positive rate of change or acceleration signal (threshold) indicating wheel spinup of a given magnitude whereby a signal is provided to deactuate the output circuit 76 and valve 24. However, as noted, it is desirable that this threshold be varied in accordance with the velocity of the vehicle; hence, the velocity sensitive spinup threshold section 64, as connected to third rate detector 56, will vary that threshold such that for higher vehicle speeds actuation of the third rate detector will be delayed or will occur at a higher wheel acceleration or spinup rate. This permits the wheels to spinup closer to vehicle speed prior to the third rate detector 56 being actuated to deactuate the output section 76 and valve 24. The velocity sensitive spinup threshold section 64 is provided to be operable to vary threshold of the third rate detector 56 generally at higher speeds and is substantially ineffective at low speeds. For medium and high mu surfaces deactuation of valve 24 will be controlled by the third rate detector 56. For low mu surfaces the spinup rate will be insufficient to actuate the third rate detector and deactuation of valve 24 is caused by the first rate detector 52.

The first rate detector section 52, as noted, will be operable to turn output section 76 on and actuate valve 24 in response to a determinable deceleration rate. The section 52, however, once actuated will be deactuated at a substantially lower deceleration rate and includes a timing circuit set to insure that sufficient time has elapsed whereby the wheels are spinning up. This time is selected to insure spinup on low mu surfaces. As noted at high velocities and on low mu surfaces, it is desirable to maintain the output section 76 and valve 24 actuated longer. The velocity sensitive latch current section 66, as operable from the velocity ramp section 62, senses the high velocity condition and will provide a signal to the first rate detector section 52 for varying the time at which the first rate detector section 52 will be deactuated to permit longer spinup time for low mu surfaces at high vehicle velocity.

SPEED SWITCH

In braking systems in which both rear brakes are closely balanced, both wheels will tend to react similarly under similar braking conditions. However, in many instances the vehicle brakes are unbalanced and the braking characteristics between one wheel and another will differ. As noted from the prior description, the system will operate generally in response to the average signal from both wheel sensors 28, 28'. Hence, it is possible for one wheel to rapidly approach a skid condition and to result in a sufficiently high average signal which would result in the output section 76 being turned on; however, at this same time the other wheel could be still substantially away from a skid condition. In this actuation the rapidly decelerating wheel would be doing substantial braking while the other wheel would be contributing only a small part of its possible effectiveness. Release of the brakes in this condition would merely accentuate this condition resulting in an unstable braking condition for the vehicle. In order to assure that both wheels contribute effectively to vehicle braking, speed inhibit section 74 has been provided. The speed switch section 74 obtains the velocity signal 48a from the first and second rate driver 48. Speed switch section 74 is connected to the output section 76 and will maintain it (and valve 24) deactuated if the average speed of the two wheels is greater than a preselected magnitude, i.e., for one vehicle system a preselected average wheel speed of 8 mph was selected. Thus the output section 76 cannot be actuated until the average wheel speed is at or below the selected value. The speed switch section 74 is provided with a latch such that once the output section 76 has been actuated the switch section 74 is ineffective even at speeds over the selected speed until the output section 76 has been deactuated by the means previously discussed at which time the speed switch section 74 is once again effective.

FAIL-SAFE

The second rate detector section 54 is a part of a fail-safe system and is connected to the fail-safe (hold-off) section 68 and fail-safe section 70. The second rate detector 54 senses deceleration of the velocity signal 48a from the first and second rate detector driver section 48 and will provide a signal indicating the occurrence of deceleration of the controlled wheels and will provide a signal 54a to actuate the fail-safe (hold-off) section 68 which controls the fail-safe section 70. The fail-safe section 70 is connected to the output section 76 and senses when the output section 76 has been actuated whereby the modulating valve 24 will be actuated relieving brake pressure. As long as the relief of brake pressure occurs as a result of excessive deceleration of the vehicle wheels in accordance with a skid control cycle, fail-safe section 70 will be rendered inoperative as a result of a signal from the fail-safe holdoff section 68 as actuated by the second rate detector section 54. In the event, however, that the modulating valve 24 is improperly actuated to relieve brake pressure, as through some malfunction, section 76 provides the signal 76a to actuate the modulating valve 24 under a non-decelerating wheel condition. In this condition the fail-safe section 70 will no longer be held off by the fail-safe holdoff section 68 since no deceleration signal will have been received by that section from second rate detector section 54. As a result, the fail-safe section 70 will then be actuated to provide a signal which will deactuate the modulating valve 24.

A spike suppressor section 72 is provided to eliminate actuation of the output section 76 as a result of transients. The voltage regulator section 46 provides regulated voltage for the succeeding circuitry, as will be seen and is also connected to be responsive to actuation of the fail-safe section 70 thereby to provide a visual indication to the vehicle operator that the skid control apparatus has been deactuated as a result of malfunction and that some correction is required. The ignition cycle circuit 44 is connected to the voltage regulator section 46 and is responsive to actuation of the vehicle ignition to provide a pulse to the summing amplifier section 42 whereby output section 76 will be actuated each time the ignition is turned on. In this way the valves, seals, etc., will be actuated to prevent deterioration. In this regard, reference is made to the copending U.S. patent application of Anthony C. Fielek, Jr. and Francis J. Weber for Skid Control System Including Valve Cycling and Checking Circuit, Ser. No. 647,001, filed June 19, 1967, and the subject matter of that application is incorporated herein by reference. Application Ser. No. 647,001 of June 19, 1967 has been abandoned with a continuation application thereof having been filed June 20, 1967 as Ser. No. 838,030, now U.S. Pat. No. 3,516,715, issued June 23, 1970.

Figure 3A:
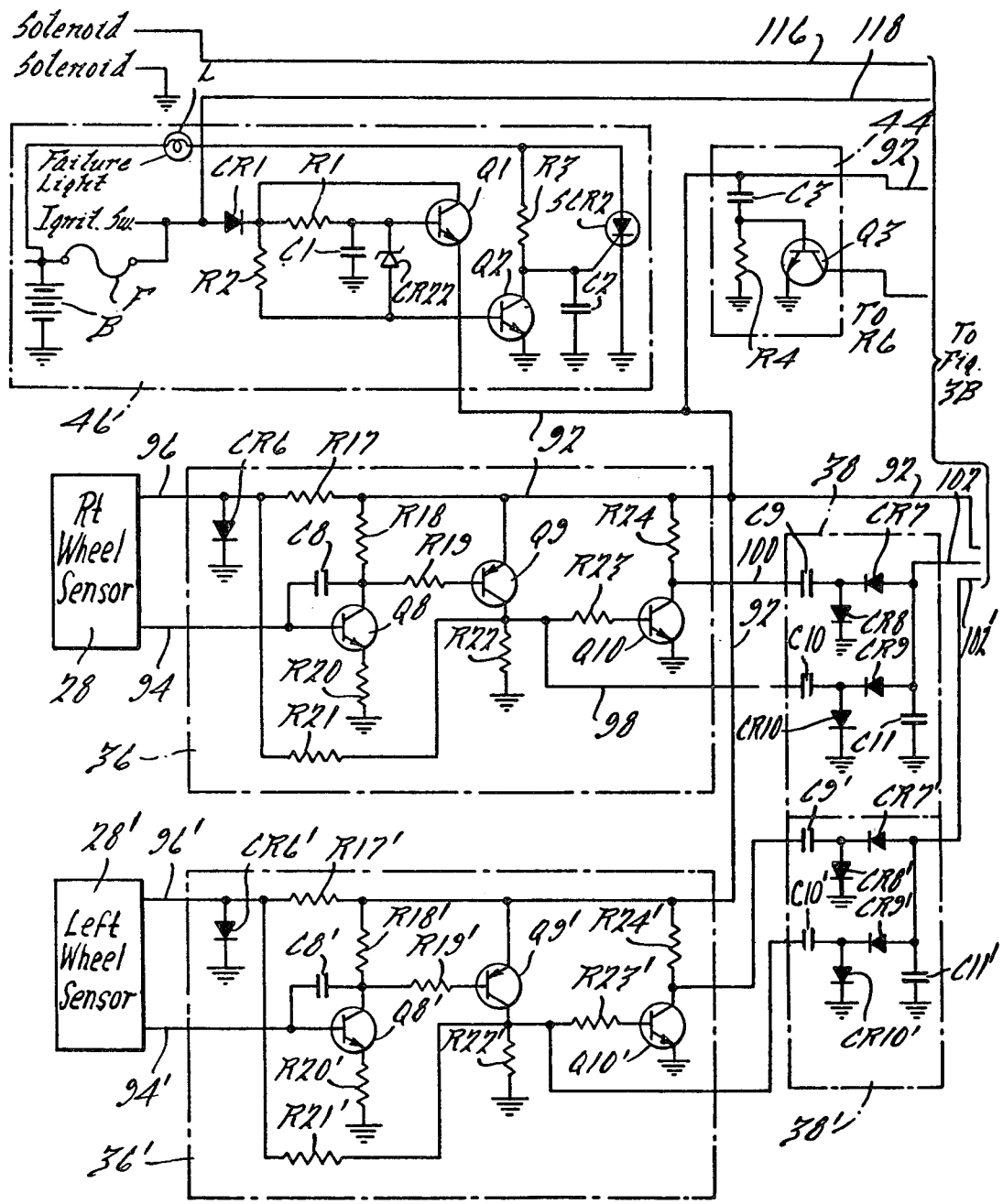

Looking now to FIGS. 3A, B and C, an electrical schematic diagram of the various sections previously described is shown.

VOLTAGE REGULATOR, ETC., SECTION 46

The battery B has its negative terminal connected to ground and has its positive terminal connected to a fail-safe fuse F, which in turn is connected to a conductor 118. An NPN transistor Q1 has its collector connected to the conductor 118 through a diode CR1 and has its emitter connected to the output via conductor 92 from which is derived the regulated B plus. The base of transistor Q1 is connected to the diode CR1 via a biasing resistor R1. A bypass capacitor C1 is connected from the base of transistor Q1 to ground. The base of transistor Q1 is also connected to ground by means of a zener diode CR 22 via the base-emitter circuit of a second NPN transistor Q2, which has its emitter connected to ground. A biasing resistor R2 is connected at the junction of the diode CR1 and resistor R1 to the base of transistor Q2. Hence, the zener diode CR22, in conjunction with remaining circuitry, will tend to maintain the bias at the base of Q1 and its output constant. The operation of the transistor Q2 and other associated circuitry shown in the circuit section 46 will be described in conjunction with the fail-safe section. As can be seen from the drawings of FIGS. 3A to 3C, the B plus line 92 is common throughout the circuitry.

AMPLIFIER, CLIPPER, ETC., SECTIONS 36, 36'

The amplifier, clipper and inverter section 36 includes an NPN transistor Q8 and a PNP transistor Q9 which are connected together to amplify the input signal. Each transistor Q8 and Q9 is biased to be driven into saturation such as to provide a square wave output signal 36b. A NPN transistor Q10 is connected to the transistor Q9 and acts as an inverter whereby the one output signal 36a can be obtained from the inverter Q10 and the other output signal 36b can be obtained from Q9, such as to provide for the frequency doubling previously discussed.

Thus the sensor 28 is connected to the amplifier, clipper and inverter section 36 via conductors 96 and 94, with conductor 94 being connected to the base of the transistor Q8 which has its emitter connected to ground via biasing resistor R20. The collector of Q8 is connected to B plus 92 via a dropping resistor R18, with resistor R18 being connected to conductor 96 via a dropping resistor R17. Conductor 96 is connected to ground via a bypass diode CR6 whereby alternate half cycles will be shunted to ground. A bypass capacitor C8 is connected between the collector and base of the transistor Q8.

The amplified signal from the collector of transistor Q8 is transmitted to the base of transistor Q9 by means of resistor R19. Q9 has its emitter connected directly to B plus line 92 and has its collector connected to ground via load resistor R22. The collector of Q9 is also connected to diode CR6 via a feedback resistor R21. The result of the amplification of input signal 28a by transistors Q8 and Q9 is a square wave output 36b appearing at the collector of Q9, which is transmitted via output conductor 98. As noted the transistor Q10 is used as phase inverter and hence its base is connected to the output at collector of transistor Q9 via a biasing resistor R23. Transistor Q10 has its collector connected to B plus via a load resistor R24. The inverted square wave 36a from the collector of transistor Q10 is transmitted to the output by conductor 100. Hence the output pulses 36a and 36b will be provided at conductors 100 and 98, respectively. The output will be a square wave of substantially constant amplitude and of a frequency which varies in accordance with the frequency of the input signal 28a from the sensor 28. The amplifier clipper and inverter circuit 36' is identical to that of the section 36 and hence the same numerical designations have been applied to similar components with the addition of a prime.

The differentiator integrator circuit 38 includes two separate differentiating circuits operating with integrating circuits having a common integrating capacitor C11; these circuits operate in a manner similar to like circuits shown and described in the copending patent application to Anthony C. Fielek, Jr., Ser. No. 695,005, filed Jan. 2, 1968 now U.S. Pat. No. 3,511,542 issued Dec. 23, 1969, for Skid Control System Including Control Circuit for a Hydraulic Modulating Valve and that application is incorporated herein by reference. The square wave output 36a at the output conductor 100 is differentiated via a capacitor C9 through a diode CR8 which has its cathode connected to ground. A second diode CR7 has its cathode connected to the anode of CR8 and has its anode connected to the capacitor C11 which is in turn connected to ground. The differentiated signal is integrated and the integrated signal appears as a direct potential across the capacitor C11. In a similar manner, the output square wave 36b at conductor 98 is differentiated and integrated with the integrated signal appearing across C11. Thus the conductor 98 is connected to differentiating capacitor C10 which in turn is connected to diode CR10 which has its cathode connected to ground, Diode CR9 has its cathode connected to the anode of diode CR10 and has its anode connected to the capacitor C11. The capacitor C11 is connected to the summing amplifier section 42 via an output conductor 102. The differentiator integrator circuit 38' is identical to section 38 and hence the same numerical designations have been applied to similar components with the addition of a prime; hence the output capacitor C11' is connected to the summing amplifier 42 via output conductor 102'. The summing amplifier 42 is a Miller integrator amplifier which provides at its output a potential varying in magnitude in accordance with variations in potential of the sum of the magnitudes appearing across the integrating capacitors C11 and C11'.

SUMMING AMPLIFIER SECTION 42

The summing amplifier section 42 includes an NPN transistor Q4 which has its base connected to conductor 102 via a biasing resistor R8 and has its base connected to conductor 102' via a similar biasing resistor R9. Transistor Q4 has its emitter connected to ground and its collector connected to the B plus line 92 via a voltage divider network comprising serially connected resistors R5 and R7. A capacitor C4 is connected from between the base and collector of transistor Q4. A base biasing resistor R6 is connected from the juncture of resistors R5 and R7 to the base of transistor Q4. Transistor Q4 is biased to be normally on and will have output signals 42a appearing at conductor 104 located at the juncture of resistors R5 and R7 and at conductor 106 connected to the collector of Q4; the output signals 42a will vary in amplitude generally in accordance with the sum of the output signals 38a and 38a'. Note that transistor Q4 is normally saturated and hence the output potential at conductors 104 and 106 will be a positive, minimum potential; however, as the charging capacitors C11 and C11' become more negative (with increasing frequency), Q4 conducts less and the potential at conductors 104 and 106 will increase. Capacitor C4 and its associated circuitry provide an additional integrating function whereby the relatively smooth output potential is provided at the output conductors 104 and 106. As noted, the output signal 42a is transmitted to the first and second rate detector driver section 48 and also to the third and fourth rate detector driver section 50, both of which are emitter follower sections and which are provided to isolate and prevent loading of the summing amplifier section 42.

RATE DETECTOR DRIVER SECTIONS 48 and 50

The first and second rate detector driver section 48 comprises an NPN transistor Q5 connected as an emitter follower and which has its base connected to conductor 104 and has its collector connected to the regulated B plus line 92. The emitter is connected to ground via a voltage divider network comprising serially connected resistors R10 and R11. The output signals 48a from the transistor Q5 are taken via a conductor 108 connected to the emitter of Q5 and a conductor 110 connected to the juncture of resistors R10 and R11.

With the third and fourth rate detector driver section 50, PNP transistor Q11 is connected as an emitter follower and has its base connected to conductor 106 and has its collector connected to ground and its emitter connected to the B plus line 92 via a load resistor R25. The output from the follower Q11 is taken via a conductor 112 connected to its emitter. The signal 48a at output conductor 110 is connected to the input of the first rate detector section 52, to the input of the second rate detector section 54, and to the input of the velocity ramp section 62. The signal 48a at output conductor 108 is connected to the speed inhibit switch section 74. The output signal 50a at conductor 112 is connected to the third rate detector section 56 and to the fourth rate detector section 58. In the discussion of the succeeding sections it should be kept in mind that signals 48a and 50a are representative of wheel angular velocity.

FIRST RATE DETECTOR SECTION 52

The first rate detector section 52 is used to actuate the driver section 76 (and valve 24) and in some cases to deactuate the section 76 (and valve 24). The section 52 is operative in response to a determinable rate of change of the velocity signal 48a indicating an excessive deceleration rate at the wheels to actuate section 76.

The section 52 includes a differentiating circuit and hence has a differentiating capacitor C16 connected to conductor 110 via a resistor R29 and is connected to ground via a resistor R31a. An NPN transistor Q13, which is normally conductive, has its base connected to the juncture between resistor R31a and capacitor C16 and is connected to ground via a diode CR16 which acts as a clamp and is connected across resistor R31a. The base of transistor Q13 is biased via serially connected resistors R30 and R31 which are connected to the B plus line 92. The emitter of Q13 is connected to ground via serially connected resistors R38 and R39 in the driver section 76. The values of resistors R30 and R31 relative to the other parameters of the circuit are such as to provide for a selected bias at the base of transistor Q13 maintaining transistor Q13 normally on. Q13 will be maintained on until the potential at the base as provided by the differentiating circuit including capacitor C16 attains a magnitude sufficient to overcome the or threshold bias set by the resistors R30, R31, etc. Threshold bias as previously noted is selected to present a preselected magnitude of wheel deceleration indicating that the wheels are decelerating at an undesirable rate in which case an output signal 52a is provided whereby the modulating valve 24 is actuated and skid control action occurs, i.e., brake pressure relieved. Transistor Q13 has its collector connected to the B plus line 92 via a load resistor R32, and has a coupling capacitor C17 connected between its base and collector. When the differentiated signal at the base of Q13 overcomes the bias, the transistor Q13 will be turned off resulting in section 76 and modulating valve 24 being turned on. The output signal 52a from the first rate detector section 52 is transmitted to the output and driver section 76 to actuate the modulating valve 24 via output conductor 112 connected to the collector of Q13. The valve 24 can be deactuated, i.e., output section 76 deactuated, when the transistor Q13 is rendered conductive. This occurs in a manner to be described.

As previously noted, it is desirable that the magnitude of the deceleration required to turn the transistor Q13 off be varied in accordance with various surface conditions, i.e., the mu of the surface as detected by wheel spinup. To provide the above variations the threshold of the first rate detector section 52 is varied by the threshold selector section 60.

THRESHOLD SELECTOR SECTION 60

Threshold selector section 60 has a PNP transistor Q12 which has its emitter-collector circuit connected in parallel across the biasing resistors R30 and R31 of the first rate detector section 52 such that variations in conductivity of the transistor Q12 will vary the impedance to the base circuit of the transistor Q13 whereby the threshold, i.e., bias at the base, of the transistor Q13 will be varied. Thus, the transistor Q12 has its emitter connected to the B plus line 92 via a load resistor R27 and has its collector connected directly to the base of transistor Q13. The base of transistor Q12 is connected to the B plus line 92 via a biasing resistor R26 which is shunted by a capacitor C15. Capacitor C15 and resistor R26 define a storage circuit which functions in a manner to be described. The base of Q12 is connected to the anode of the diode CR15 which in turn is connected to a dropping resistor R28 which in turn is connected to ground through a resistor R50 in the fourth rate detector section 58. As previously noted, the fourth rate detector section 58 senses wheel spinup and will vary the potential across the resistor R50 (in a manner to be described) in accordance with the magnitude of the acceleration of the wheel. Variations in the potential across the resistor R50 will vary the bias of the base of transistor Q12 and hence will vary its conductivity. The conductive condition of Q12, as affected by the spinup, will be stored by the circuit including capacitor C15 and resistor R26 whereby the spinup information will be available to affect the theshold of the transistor Q13 for the succeeding cycle. Thus as the spinup rate increases, the potential across the resistor R49 increases which decreases the conductivity of the transistor Q21; this causes a decrease in potential across resistor R50 resulting in transistor Q12 being rendered more conductive which in turn results in a decrease in the shunt resistance provided by the transistor Q12 and resistor R27 across the biasing resistors R30 and R31 for transistor Q13. The effect of this is to increase the conduction bias at the base of transistor Q13. In this condition a greater deceleration signal is required to render the transistor Q13 non-conductive. Thus the threshold selector circuit 60 is affected by the output from the fourth rate detector section 58, i.e., spinup, to compensate for high u surface conditions.

FOURTH RATE DETECTOR SECTION 58

Generally, the fourth rate detector section 58 comprises a differentiating circuit which is responsive to positive changes in the velocity signal 50a and hence senses the spinup or acceleration of the vehicle wheels. The detector section 58 comprises a PNP transistor Q21 which has its emitter connected to the B plus line 92 and has its collector connected to the output resistor R50 and hence is connected to the conductor 114 to the threshold selector section 60. The base of the transistor Q21 receives the output signal 50a from the third and fourth rate detector driver section 50 via the conductor 112 via a differentiating capacitor C19. The base of transistor Q21 is connected to ground via a dropping resistor R49. A bypass capacitor C20 is connected directly between the base and collector of transistor Q21. Capacitor C19 and resistor R49 along with the other parameters of the circuit define a differentiating circuit such that the variations in velocity signal 50a indicating spinup will result in an output signal at the collector of transistor Q21. The transistor Q21 is normally conductive and will be rendered less conductive in response to higher acceleration rates thereby resulting in a decrease in potential across resistor R50 and the conductor 114 resulting in variation in the conductivity of the transistor Q12 and hency variation to the threshold to the transistor Q13. The output from the fourth rate detector 58 via conductor 114 is also used to reset the velocity ramp section 62; this functions in a manner to be described. Thus the first rate detector section 52, in accordance with the output signal appearing at conductor 112, as affected by the threshold selector section 60 and by the fourth rate detector section 58, can actuate the output and driver section 76 and hence can actuate the modulating valve 24.

OUTPUT AND DRIVERS SECTION 76

The output and drivers section 76 comprises transistors Q14, Q15, Q16 and Q17, all of which are normally maintained non-conductive. The transistor Q16 is a power transistor and is connected to the solenoid for the modulating valve 24 via an output conductor 116 whereby when transistor Q16 is rendered conductive valve 24 is actuated to relieve brake pressure. Transistor Q16 is an NPN type transistor and has its emitter connected to the output conductor 116 and has its base connected to a diode CR17 which has its cathode connected to resistor R37 which is connected to ground. The conductivity of the power transistor Q16 is controlled by the switching transistor Q15 and hence the base (input) of Q16 is connected to the collector (output) of the PNP type transistor Q15. Q15 has its emitter connected to the battery B via conductor 118. Transistor Q15 is normally biased off and has its base connected to the conductor 118 via a biasing resistor R34; the base of switching transistor Q15 is also connected to control transistor Q14 via a resistor R35 such that the conductivity of Q15 is determined by Q14.

The NPN type transistor Q14 is normally nonconductive and has its collector connected to the resistor R35 and has its base connected to ground via a resistor R36. The emitter of transistor Q14 is connected to ground through the emitter-collector circuit of a second control transistor Q17 and hence the conductivity of Q14 is determined by Q17. Transistor Q17 is of the PNP type and has its collector connected directly to the emitter of transistor Q14 and has its emitter connected to ground via a load resistor R39. Thus the conductivity of transistor Q17 is determined by Q14. The base of transistor Q17, in turn, is connected to ground through a transistor Q29 in the speed inhibit switch section 74 (which operates in a manner to be described). Thus in order for the power transistor Q16 to be rendered conductive, i.e., output section 76 and modulating valve 24 actuated, both control transistors Q14 and Q17 must be placed in a conductive condition. Also to maintain the transistor Q16 conductive both control transistors Q14 and Q17 must be conductive. As will be seen, the control transistor Q14 is controlled by the first rate detector section 52 to actuate and deactuate the output section 76 while control transistor Q17 is controlled by the speed switch inhibit section 74 to permit actuation of output section 76 and by the third rate detector section 56 to deactuate output section 76.

The output transistor Q13 of the first rate detector section 52 has the output conductor 112 connected to the base of the first control transistor Q14. Thus the occurrence of an output signal indicating that the preselected deceleration rate has been reached or exceeded will result in Q13 being rendered non-conductive which, in turn, will bias the transistor Q14 into a conductive state. Note however that Q14 cannot conduct unless transistor Q17 can conduct. The conduction of Q17, however, is controlled both by the speed inhibit switch section 74 and also by the third rate detector section 56, both to be subsequently described. Assuming, however, that transistor Q17 is at this time conductive, the output signal from transistor Q13 will render transistor Q14 conductive which in turn will turn on switching transistor Q15 which will then render power transistor Q16 conductive whereby the output signal 76a will be initiated and the modulating valve 24 will be actuated whereby brake pressure will be relieved. Upon the non-conductivity of transistor Q13 and termination of the output signal at conductor 112, control transistor Q14 will be turned off whereby the signal 76a will be terminated resulting in deactuation of the modulating valve 24 and reapplication of brake pressure.

In order to permit wheel spinup, the transistor Q13 is maintained non-conductive even after the deceleration rate is no longer at the objectionable level. This is provided by the combined effect of the discharge time of capacitor C16 and by the transistor Q17. With Q17 conductive the potential at the resistor R39 in the emitter circuit of the transistor Q13 is increased. This tends to maintain Q13 non-conductive and requires an even greater reduction in the bias at the base of Q13 and hence requires an even larger discharge time. As noted, this discharge time period is selected whereby generally the transistor Q13 will control to turn the output section 76 off for low mu surface conditions, i.e., low spinup.

As previously discussed, it is also desirable that the output section 76 be maintained on or actuated for a longer period of higher vehicle velocities. Hence, the velocity sensitive latch current section 66 (which operates in a manner to be described) is connected to the resistor R39 via an output conductor 120 such that for higher vehicle velocities the impedance between the emitter of transistor Q17 and ground will be varied in a manner whereby a longer discharge time for capacitor C16 will be required and transistor Q13 will be maintained off for a longer time. Note that the velocity sensitive latch current section 66 is connected to the output section 76 by means of a conductor 122 connected to the collector of transistor Q14 whereby the velocity sensitive latch current section 66 is maintained inoperative (in a manner to be described) until the section 76 has been actuated. This is provided so that the velocity sensitive latch current section 66 will have no effect on the actuation of the first rate detection section 52 and on the initiation non-conduction of the transistor Q13 but will be effective only, after section 76 has been actuated, in turning the transistor Q13 on and hence effective only in deactuating the output section 76. Thus the section 76 will be actuated in response to the output signal 52a from the first rate detector section 52 and will be deactuated upon cessation of the output signal 52a when the transistor Q13 is turned on.

The first rate detector section 52 provides only one of the means of deactuating the output section 76 and, as noted, this is effective for low mu surface conditions. For high mu surface conditions the third rate detector section 56 is utilized.

THIRD RATE DETECTOR SECTION 56

The third rate detector section 56 generally is a differentiating circuit which senses the rate of change of the velocity signal 50a from the third and fourth rate detector driver section 50. Hence the third rate detector section 56 has a differentiating capacitor C21 which is connected to the output conductor 112 from the third and fourth rate detector driver section 50. Capacitor C21 is connected to the base of PNP transistor Q22 which has its emitter at the B plus line 92 and has its collector connected to its base via a coupling capacitor C22. The transistor Q22 is base biased by means of a resistor R51 connected from the B plus line 92 to its base with the base also being connected to ground via resistor R52. A regulating diode CR19 is connected between the base and emitter of transistor Q22 with its anode connected to the base. The output signal from the transistor Q22 is connected to the base of transistor Q17 via the conductor 124 which is connected to resistor R40. Thus, upon the occurrence of a high wheel acceleration, indicating a high wheel spinup, and also indicating a high mu surface, the transistor Q22 will be turned off thereby increasing the potential at the base of the transistor Q17 turning the transistor Q17 off. With Q17 turned off, transistor Q14 is rendered nonconductive along with transistors Q15 and Q16 whereby the output section 76 will be deactuated and the modulating valve 24 will be deactuated resulting in reapplication of brake pressure.

As noted, it is desirable that for high velocities and on high mu surfaces the wheels be permitted to spinup for a longer period and hence it is desirable to maintain the output section 76 actuated longer. To provide this the threshold of the third rate detector section 56 is varied such that at higher velocities higher wheel accelerations will be required to render the transistor Q22 non-conductive. This is done by the vehicle sensitive spinup threshold section 64 which has a conductor 126 connected to the base of the transistor Q22 and operates in a manner to be described such as to vary the bias of the base Q22 such that at higher vehicle velocities transistor Q22 will become non-conductive only at higher accelerations or greater wheel spinup.

Thus in the deactuation of the output section 76 both the first rate detector section 52 and the third rate detector section 56 have their operating characteristics varied with vehicle velocity such that at higher vehicle velocities on both high and low mu surfaces, the output section 76 will be turned off later than at lower vehicle velocities. This is accomplished by the velocity sensitive spinup threshold section 64 and the velocity sensitive latch current section 66, both of which are affected by the velocity ramp section 62.

VELOCITY RAMP SECTION 62

The velocity ramp section 62 comprises a storage circuit with the magnitude of the stored charge at any one time being used to provide an indication of vehicle velocity. The magnitude of the charge is decreased in accordance with a preselected discharge rate to correspond to a preselected deceleration rate whereby an analogue of vehicle velocity is obtained. The velocity signals 42a and 50a provide a true indication of vehicle velocity only when wheel speed and vehicle speed are the same, i.e., no slip. Since during a skid controlling cycle there is substantial slip the analogue is used to provide an indication of vehicle velocity. Thus the velocity ramp section 62 includes a storage capacitor C23, the magnitude of charge of which is used to provide an analogue of the magnitude of vehicle velocity. The capacitor C23 has one side connected to ground and has its opposite side connected to receive the velocity signal 48a via the conductor 110 through a charging resistor R59 and diode CR20 which has its cathode connected to the capacitor C23. Note that in the circuit described thus far the charge path is defined and as long as the potential of the velocity signal at conductor 110 is greater than the charge at capacitor C23, charge current will flow through the resistor R59 and diode CR20. The charge path has a fast charge time. The discharge path of the capacitor C23 is defined by a discharge resistor R55 which is connected across the capacitor C23 and has a relatively long discharge time constant with the rate of change of charge being selected to simulate a preselected average deceleration rate, i.e., 8 ft./sec.$^2$ for one system. Thus in the event of a skid control cycle the wheel velocity signal 48a will decrease rapidly as the wheel slip and the charge on capacitor C23 will exceed the signal 48a reverse biasing diode CR20. At this time capacitor C23 will discharge through resistor R55 at the selected rate such that the charge lost will proximate loss of vehicle speed and the charge remaining on C23 will simulate the vehicle speed at that time. The magnitude of charge on C23, however, will be in some degree of error for vehicle decelerations different than the selected representative discharge rate. The selected discharge rate is not adequate for high u surface since it would provide an indication of a higher vehicle speed than actually exists and would act on the third rate detector section 56 (via threshold section 64) to delay deactuation of output section 76 whereby the wheels would spinup too far and could even be free rolling for a substantial period whereby the stopping distance would be increased. Thus is is desirable under these conditions to reset the velocity ramp potential at C23; this is done by transistors Q23 and Q24. Transistor Q23 is an NPN transistor which defines an alternate, rapid discharge path for the capacitor C23 and has its emitter connected to ground and its collector connected to the capacitor C23 via a load resistor R54. The base of the transistor Q23 is connected to ground via biasing resistor R57. Transistor Q23 is normally nonconductive and is rendered conductive by the switching transistor Q24. Q24 is a PNP transistor having its emitter connected to the B plus line 92 via resistor R56 and has its collector connected directly to the base of transistor Q23 such that when Q24 (which is normally nonconductive) is turned on it will render Q23 conductive. The base of transistor Q24 is connected to the resistor R50 of the fourth rate detector section 58 such that in the event of a rapid spinup indicating a high u surface, the transistor Q24 will be rendered conductive turning the transistor Q23 on resulting in the capacitor C23 being discharged. In this case then the capacitor C23 will be recharged in accordance with the velocity signal 42a which under these conditions will more accurately represent vehicle velocity.

The output from the velocity ramp section 62 is utilized in both the velocity sensitive spinup threshold section 64 and in the velocity sensitive latch current section 66.

VELOCITY SENSITIVE SPINUP THRESHOLD SECTION 64

This section generally comprises an amplifier circuit which has an output which follows the variations in charge of the velocity ramp capacitor C23; this circuit includes an NPN transistor Q25 which has its collector connected to the conductor 126 and hence to the base of the transistor Q22 in the third rate detector section 56; Q25 has its emitter connected to ground via a load resistor R58. The base of the transistor Q25 is connected to the velocity ramp capacitor C23. The transistor Q25 is generally nonconductive and is rendered conductive generally at higher vehicle velocity speeds, i.e., higher potentials at capacitor C23. Once the transistor Q25 is conductive its conductivity with vary with variation in the charge on the ramp capacitor C23 and hence there will be a variation in its output with vehicle velocity. The collector-emitter circuit of the transistor Q25 parallels the bias resistor R52 at the base of transistor Q22 in the third rate detector section 56 and thus as the transistor Q25 is rendered more conductive, the resistance of the base to ground of transistor Q22 will be decreased resulting in an increase in its bias which results in transistor Q22 being rendered non-conductive only in response to a greater acceleration (spinup) rate. This results in the output section 76 being actuated longer at higher vehicle velocities.

The transistor Q25 is also utilized as an emitter follower and the output at its emitter is transmitted to the velocity sensitive latch current section 66 via the conductor 128.

VELOCITY SENSITIVE LATCH CURRENT SECTION 66

Conductor 128 is connected to the base of an amplifying, NPN type transistor Q26 which has its emitter connected to the base of an NPN transistor Q27. The collectors of transistors Q26 and Q27 are connected together and are connected to the positive side of the battery B via conductor 118. The transistors Q26 and Q27 follow each other in conduction and are normally maintained nonconductive and will be placed in a condition for conduction in response to a signal at the conductor 128. However, a transistor Q28 provides the latching function previously discussed and will determine the time at which transistors Q26, Q27 will be rendered conductive.

The output from transistor Q27 is connected to the conductor 120 and hence upon conduction of transistor Q27 the resistance from the emitter of transistor Q17 to ground will be varied to vary the on time, i.e., turn-off potential, for the transistor Q13 in the first rate detector section 52 such that at high vehicle velocities a longer dicharge time for capacitor C16 will be required to render Q13 nonconductive to deactuate output section 76.

As noted, it is desirable that the variations in vehicle velocity be effective on the conductivity of the transistor Q13 only after the output circuit 76 has been actuated, i.e., so that there will be no effect on the time or deceleration rate at which the transistor Q13 will be turned on. This latter function is provided by the NPN transistor Q28 which has its emitter connected to ground and has its collector connected to the emitter of transistor Q27 via the conductor 120 and resistor R59. The base of the latching transistor Q28 is connected to the collector of transistor Q14 via conductor 122 via a diode CR21 and resistor R60 with the diode CR21 having its cathode connected to the resistor R60. The transistor Q28 is normally conductive and when in this condition will maintain transistors Q26 and Q27 nonconductive. However, when the output section 76 is actuated and transistor Q14 is turned on transistor Q28 will be turned off, via the potential at conductor 122, thereby placing transistors Q26 and Q27 in a conductive condition.

Thus the velocity of the vehicle as obtained from the analogue from the potential across capacitor C23 is utilized varying the off time or the time at which the output section 76 will be deactuated and hence the time at which the modulating valve 24 will be turned off and the brake pressure reapplied.

SPEED INHIBIT SWITCH SECTION 74

As previously noted it is desirable in order to account for wheel and/or brake unbalance that the output switch 76 be deactuated until both wheels are decelerated to a preselected velocity, i.e., for one system 8 miles per hour. This is done by the speed inhibit switch section 74. Section 74 includes an NPN transistor Q29 which has its collector connected to the base of the control transistor Q17 and has its emitter connected to ground. Its base is also connected to ground via a biasing resistor R62. The velocity signal 48a is transmitted to the base of transistor Q29 via a resistor R61. Transistor Q29 is normally nonconductive and will be rendered conductive when the velocity signal is of a magnitude corresponding to a wheel speed greater than a selected wheel speed, e.g., 8 miles per hour, at which time transistor Q29 will be rendered conductive. With Q29 conductive control transistor Q17 will then be in a condition to conduct since the ground circuit for its base is through the collector-emitter circuit of transistor Q29. If the average wheel speed is greater than 8 miles per hour, transistor Q29 will not be rendered conductive and hence the transistor Q17 cannot conduct; in this case Q14 cannot be rendered conductive despite the fact that an actuating signal would appear at the conductor 112 from the transistor Q13. Thus the transistor Q29 will assure that the output section 76 cannot be actuated unless the average wheel speed is less than a preselected magnitude.

It is desirable that the speed inhibiting affect be effective only in the actuation of the output circuit 76 and not while circuit 76 is actuated. This function is provided by the NPN transistor Q30 which has its collector connected to the base of transistor Q29 and has its emitter connected to ground. The base of transistor Q30 is connected to the juncture between resistor R37 and diode CR17 in the output circuit of control transistor Q5 via a load resistor R63. Thus when the output section 76 is rendered conductive such that transistor Q15 is conductive, transistor Q30 will be rendered conductive and in its conductive condition will maintain transistor Q29 conductive even though the velocity signal at conductor 108 exceeds the preselected magnitude. In this way the transistor Q29 and its inhibiting effect are maintained ineffective while the output section 76 is actuated.

SECOND RATE DETECTOR SECTION 54; FAIL-SAFE HOLDOFF SECTION 68; FAIL-SAFE SECTION 70

The second rate detector section 54 is utilized with the fail-safe holdoff section 68 and the fail-safe section 70 to provide means for deactuating the system in the event of a detected malfunction. The second rate detector section 54 is similar to the first rate detector section 52 and is a differentiating circuit which provides an output in accordance with the detection of a preselected deceleration rate. Thus an NPN transistor Q6 has its base connected to conductor 110 for receiving output signal 48a via differentiating capacitor C5. Transistor Q6 has its collector connected to the B plus line 92 via load resistor R13 and a biasing resistor R12 is connected from the base of Q6 to the B plus line 92. A bypass capacitor C6 is connected between the collector and base of transistor Q6. The emitter of transistor Q6 is connected to the emitter of transistor Q13 such that its operation is affected by the circuitry including resistor R38, R39 and transistor Q17 much in the same manner as transistor Q13. Thus in the event of a deceleration signal (which is selected to be a lower rate than that for which the first rate detector is set), an output signal 54a will be transmitted from the collector of transistor Q6 via output conductor 130 to the fail-safe holdoff section 68.

Output conductor 130 is connected to a fail-safe hold-off section 68 which comprises an NPN transistor Q7 which is normally nonconductive and has its emitter connected to ground and its base connected to the output conductor 130 via serially connected diodes CR2 and CR3. A biasing resistor R14 is connected from the base to ground. The transistor Q7 is normally nonconductive and will be rendered conductive in response to a deceleration signal 54a appearing at conductor 130.

The output from the fail-safe holdoff section 68 is connected to the fail-safe section 70 by means of a conductor 132 which is connected to the collector of transistor Q7. The conductor 132 is connected to the gate of an SCR 1 such that when the transistor Q7 is conductive, the gate will be substantially at ground potential thereby maintaining SCR 1 nonconductive. The gate SCR 1 is also connected to ground via a capacitor C7. The cathode of the SCR 1 is also connected directly to ground while its anode is connected to the output conductor line 116 via a load resistor R16. Gate bias is provided by a diode CR4 which is serially connected to resistor R15, both of which are connected between conductor 116 and the gate. In the event that the transistor Q16 is turned on without the presence of a skid control signal the transistor Q6 of the second rate detector section 54 will be nonconductive and the transistor Q7 of the hold-off section 68 will be nonconductive. This will permit the gate of SCR 1 to be raised in potential whereby SCR 1 will fire. The anode-cathode circuit of SCR 1 is in series with the battery B, fuse F, transistor Q16, and output conductor 116 and will provide a low impedance path for fuse F causing it to blow; this will remove battery B from the circuit and will de-energize the circuit preventing actuation of the valve 24.

With the fuse F out, the voltage regulator transistors Q1 and Q2 are rendered nonconductive. Transistor Q2 controls the gate of an SCR 2 and has its collector connected to the gate such that when Q2 is conductive SCR 2 cannot conduct. When Q2 is nonconductive, as when fuse F opens, SCR 2 can conduct. SCR 2 has its gate connected to ground via capacitor C2 and has its gate connected to battery B via resistor R3 and failure light L. The anode-cathode circuit of SCR 2 is connected across light L and battery B. Thus in the event of a malfunction and opening of fuse F, SCR 2 will be rendered conductive and light L will be lit to provide a visual indication of malfunction to the vehicle operator.

SPIKE SUPPRESSOR SECTION 72

The section 72 comprises a diode CR 5 and a zener diode CR 23 with the zener CR 23 having its cathode connected to ground and its anode connected to the anode of diode CR 5 which in turn has its cathode connected to conductor 116. The spike suppressor section 72 removes transients which might inadvertently actuate valve 24.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. In a skid control system for controlling fluid pressure actuated brakes of at least one wheel of a wheeled vehicle by controlling the fluid pressure to the brakes via a modulating valve actuated to one condition for relieving the fluid pressure and to another condition for applying the fluid pressure, the invention comprising: control circuit means for actuating the modulating valve to the one condition in response to a deceleration of the wheel of a first determinable magnitude, said control circuit means comprising first acceleration means responsive to the acceleration of the wheel following actuation of the modulating valve to the one condition for varying said first determinable magnitude in accordance with variations in the magnitude of the acceleration.

2. The system of claim 1 with said control circuit means actuating the modulating valve to the other condition in response to a different condition having a different determinable magnitude and further comprising velocity means for providing a velocity signal representative of the velocity of the vehicle and varying said different determinable magnitude in response to variations in the magnitude of said velocity signal.

3. The system of claim 2 with said velocity means including means for increasing said different determinable magnitude in response to magnitudes of said velocity signal representative of higher vehicle velocities whereby actuation of the modulating valve to said other condition will be delayed at higher vehicle velocities.

4. The system of claim 3 with said velocity means comprising electrical storage means for storing an electrical charge with said charge being said velocity signal and having a magnitude representative of vehicle velocity with the magnitude of the charge varying in accordance with a preselected time rate.

5. The system of claim 1 with said control circuit means comprising second acceleration means responsive to the acceleration of the wheel of a second determinable magnitude following actuation of the modulating valve to the one condition for actuating the modulating valve to the other condition.

6. The system of claim 1 with the modulating valve being actuated to the one condition in response to initiation of a control signal and to the other condition in response to termination of said control signal and with said control circuit means comprising output circuit means for initiating said control signal in response to the deceleration of the wheel of said first determinable magnitude.

7. The system of claim 6 with said output circuit means including means for terminating said control signal a determinable time after the deceleration decreases to a selected magnitude below said first determinable magnitude.

8. The system of claim 7 with said control circuit means further comprising velocity means for providing a velocity signal representative of the velocity of the vehicle and varying said first determinable time in response to variations in magnitude of said velocity signal.

9. The system of claim 8 with said velocity means including means for increasing said determinable time in response to magnitudes of said velocity signal representative of higher vehicle velocities.

10. The system of claim 9 with said velocity means comprising electrical storage means for storing an electrical charge with said charge being said velocity signal and having a magnitude representative of vehicle velocity with the magnitude of the charge varying in accordance with a preselected time rate.

11. The system of claim 1 with the modulating valve being actuated to the one condition in response to a first control signal and to the other condition in response to a second control signal, said control circuit means comprising output circuit means for providing said first control signal in response to the deceleration of the wheel of said first determinable magnitude, said control circuit means comprising second acceleration means for providing said second control signal in response to the acceleration of the wheel attaining a second determinable magnitude following actuation of the modulating valve to the one condition.

12. The system of claim 11 with said control circuit means further comprising velocity means for providing a velocity signal representative of the velocity of the vehicle and varying said second determinable magnitude in response to variations in magnitude of said velocity signal.

13. The system of claim 12 with said velocity means including means for increasing said second determinable magnitude in response to magnitudes of said velocity signal representative of higher vehicle velocities whereby actuation of the modulating valve to said other condition will be delayed at higher vehicle velocities.

14. The system of claim 12 with the modulating valve being actuated to the one condition in response to initiation of said first control signal and to the other condition in response to termination of said first control signal and with said control circuit means comprising output circuit means for initiating said first control signal in response to the deceleration of the wheel of said first determinable magnitude.

15. The system of claim 14 with said output circuit means including means for terminating said first control signal a determinable time after the deceleration decreases to a selected magnitude below said first determinable magnitude.

16. The system of claim 15 with said control circuit means further comprising velocity means for providing a velocity signal representative of the velocity of the vehicle and varying said determinable time in response to variations in magnitude of said velocity signal.

17. The system of claim 16 with the modulating valve controlling the fluid pressure to the brakes of a plurality of wheels and further comprising wheel velocity means responsive to the velocity of the wheels for preventing actuation of the valve to said one condition unless the velocity of the wheels is below a preselected magnitude.

18. The system of claim 1 with the modulating valve controlling the fluid pressure to the brakes of a plurality of wheels and further comprising wheel velocity means responsive to the velocity of the wheels for preventing actuation of the valve to said one condition unless the velocity of the wheels is below a preselected magnitude.

19. In a skid control system for controlling fluid pressure actuated brakes for at least one wheel of a plurality of wheels of a wheeled vehicle by controlling the fluid pressure to the brakes via a modulating valve actuated to one condition for relieving the fluid pressure and to another condition for applying the fluid pressure, the invention comprising: control circuit means for actuating the modulating valve to the one condition in response to a selected occurrence, said control circuit means comprising wheel velocity means responsive to the velocity of at least one of the wheels for preventing actuation of the valve to said one condition unless the velocity of the wheel is below a preselected magnitude with said control circuit means including disabling means for disabling said wheel velocity means when the modulating valve is in the one condition.

20. An anti-lock brake control system for a wheeled vehicle adapted to the coefficient of friction between a braked wheel and the surface on which the vehicle is supported, comprising
 means for generating a first electrical signal proportional to acceleration of a braked wheel,
 means for producing a deceleration reference electrical signal which represents optimum wheel declleration for vehicle braking on a given surface,
 means responsive to the reference signal and the first signal for cyclically producing a brake control signal when said first and reference signals attain predetermined relationships,
 brake pressure modulating means responsive to the brake control signal for cyclically relieving and applying brake pressure, whereby the brake pressure modulating means relieves brake pressure to permit wheel speed recovery and thereafter reapplies brake pressure, and
 means responsive to positive wheel acceleration in each cycle for altering the reference signal value for the subsequent cycle according to the value of the positive wheel acceleration during wheel speed recovery, so that the control system is conditioned to the value of wheel acceleration and hence to the coefficient of friction between the wheel and the surface.

21. An anti-lock brake control system for a wheeled vehicle comprising
 means for generating a first electrical signal proportional to wheel acceleration,
 means for producing a deceleration reference electrical signal which represents optimum wheel deceleration for vehicle braking on a predetermined coefficient of friction surface,
 means responsive to the reference signal and the first signal for cyclically producing a brake control signal when said first and reference signals attain predetermined relationships, brake pressure modulating means responsive to the brake control signal for cyclically relieving and applying brake pressure, whereby the brake pressure modulating means relieves brake pressure to permit wheel speed recovery and thereafter reapplies brake pressure, and means responsive to positive wheel acceleration in each cycle for altering the reference signal for the subsequent cycle to a different value when the positive wheel acceleration attains a predetermined value during wheel speed recovery, so that the control system is conditioned to the value of the wheel acceleration and hence to the coefficient of friction between the wheel and the surface.

22. An anti-lock brake control system for a wheeled vehicle comprising means for generating a first electrical signal proportional to wheel acceleration, means for producing a deceleration reference electrical signal which represents optimum wheel deceleration for vehicle braking on a predetermined coefficient of friction surface, means responsive to the reference signal and the first signal for cyclically producing a brake control signal when said first and reference signals attain predetermined releationships, brake pressure modulating means responsive to the brake control signal for cyclically relieving and applying brake pressure, whereby the brake pressure modulating means relieves brake pressure to permit wheel speed recovery and thereafter reapplies brake pressure, means responsive to positive wheel acceleration in each cycle for altering the reference signal value for the subsequent cycle according to the value of the positive wheel acceleration during wheel speed recovery, so that the control system is conditioned to the value of wheel acceleration and hence to the coefficient of friction between the wheel and the surface, said last means being responsive to wheel acceleration for sensing predetermined wheel acceleration signals and for increasing the deceleration reference signal to render the brake control signal means less sensitive to the predetermined wheel acceleration signals.

* * * * *